Figure 1:
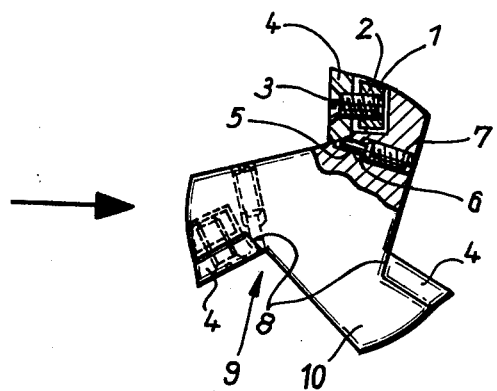

United States Patent [19]

Kress et al.

[11] 4,211,507
[45] Jul. 8, 1980

[54] ROTARY CUTTING TOOL WITH RADIALLY ADJUSTABLE, REVERSIBLE TOOL BITS

[75] Inventors: Dieter Kress, Aalen; Friedrich Häberle, Lauchheim, both of Fed. Rep. of Germany

[73] Assignee: MAPAL Fabrick für Präzisicnswerkzeuge Dr. Kress KG, Aalen, Fed. Rep. of Germany

[21] Appl. No.: 941,726

[22] Filed: Sep. 12, 1978

[30] Foreign Application Priority Data

Sep. 13, 1977 [DE] Fed. Rep. of Germany ....... 2741130

[51] Int. Cl.² .............................................. B26D 1/12
[52] U.S. Cl. ....................................... 407/37; 407/40; 407/48; 407/103
[58] Field of Search ...................... 407/36, 37, 38, 39, 407/40, 42, 44, 45, 48, 77, 78, 85, 86, 87, 102, 103, 104

[56] References Cited

U.S. PATENT DOCUMENTS

| | | | |
|---|---|---|---|
| 1,266,249 | 5/1918 | Ginsberg | 407/78 |
| 2,877,536 | 3/1959 | Monosmith | 407/79 |
| 3,103,736 | 9/1963 | Ortman, Jr. | 407/48 |
| 3,160,945 | 12/1964 | Johnson | 407/103 |
| 3,267,554 | 8/1966 | Ryan | 407/73 |
| 3,303,556 | 2/1967 | Pinkowski | 407/48 |
| 3,341,919 | 9/1967 | Lovendahl | 407/104 |
| 3,515,029 | 6/1970 | Gambini | 407/46 |
| 3,827,119 | 8/1974 | Bennett | 407/45 |

*Primary Examiner*—Harrison L. Hinson
*Attorney, Agent, or Firm*—Toren, McGeady and Stanger

[57] ABSTRACT

The cutter head of a rotary cutting head is formed with three pairs of recesses separated by a wall portion of the head. An abutment member is received in one recess of each pair, and a tool bit in the other recess in such a manner that a cutting edge of the bit projects from the cutter head. A threaded fastener engages the bit and the abutment member and clamps the bit to the wall portion, thereby releasably fastening the bit to the head.

6 Claims, 2 Drawing Figures

ROTARY CUTTING TOOL WITH RADIALLY ADJUSTABLE, REVERSIBLE TOOL BITS

This invention relates to rotary cutting tools, and particularly to a cutting tool in which at least one reversible tool bit is releasably fastened to the head, and a cutting edge of the bit projects from the cutter head.

In most rotary cutting tools equipped with reversible tool bits which are in current practical use, the cutter head is provided with at least one axially elongated recess or groove in which the tool bit is clamped toward the trailing circumferential wall of the recess or groove by a clamping jaw. While the clamping jaw has well established advantages in holding the bit in a precise and well defined position not affected by working stresses, it interferes at least to some extent with the removal of chips. The jaw needs to be secured to the cutter head by means of a threaded fastener received in a bore of the cutter head which limits the choice of locations for the adjustable backing member needed for radially adjusting the tool bit. The last-mentioned problem is particularly irksome when the tool bits employed are small and/or the cutter head is of small overall diameter.

It is the primary object of the invention to provide a cutting tool of the type described with an adjustable fastening arrangement for the tool bit which is free of the afore-mentioned shortcomings of a clamping jaw without loss of the desirable features of a jaw. More specifically, the invention aims at a fastening arrangement more suitable than a clamping jaw for securing a small tool bit on a cutter head of small overall diameter.

With these objects and others in view, as will presently become apparent, the invention provides a rotary cutter head with as many pairs of first and second recesses as there are tool bits to be fastened. Each first recess receives an abutment member, and the associated second recess receives a tool bit. A wall portion of the cutter head circumferentially separates the two recesses, and a threaded fastener engages the bit and abutment member so as to clamp the bit to the wall portion.

Figure 2:
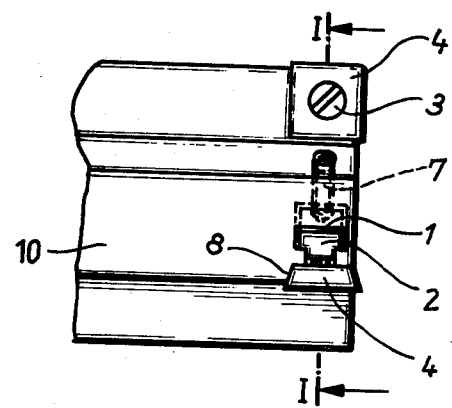

Other features, additional objects, and many of the attendant advantages of this invention will readily be appreciated as the same becomes better understood from the following detailed description of a preferred embodiment when considered in connection with the appended drawing in which:

FIG. 1 shows a cutting tool of the invention in front elevation and partly in section on the line I—I in FIG. 2; and FIG. 2 is a fragmentary side-elevational view of the tool of FIG. 1 taken in the direction of the arrow in FIG. 1.

Referring now to the drawing in detail, there is shown only as much of an otherwise conventional cutting tool as is needed for an understanding of the invention, the drawing being limited to the cutter head 10 which is symmetrical relative to its axis of rotation and fixedly fastened on a coaxial shank, not shown. The cutter head 10 is formed with three axially elongated, wide recesses 9 which are open in a radially outward direction and in an axially forward direction. A radially open recess 1 is circumferentially separated from each recess 9 by an integral wall portion of the cutter head 10 which is approximately radial. The cutter head rotates normally counterclockwise, as viewed in FIG. 1, so that the afore-mentioned wall portion provides the trailing wall of the recess 9 and the leading wall of the recess 1.

An approximately T-shaped abutment member 2 is received in the recess 1. Shoulder portions of the abutment member 2 engage the leading wall of the recess 1 about an opening in the wall. The shank of a clamping screw 3 passes with clearance through the wall opening and is threadedly received in a bore of the abutment member 2 between the shoulder portions of the latter. The conically enlarged head of the screw 3 is received flush in a conforming bore connecting the two major faces of a plate-shaped tool bit 4.

The major faces of the bit 4 are square, and the four, rectangularly offset portions of the narrow edge face connecting the major portions converge from one major face toward the other. Four cutting edges are formed thereby. One of the cutting edges is parallel to the axis of rotation and projects radially from the recess 9. Another cutting edge projects axially beyond the cutter head 10. A backing member 5 engages the edge face portion in the recess 9 opposite the radially projecting cutting edge. It has the general shape of a cylinder with an elliptical end face obliquely inclined to its axis. The backing member 5 is received in a partly threaded bore 6 in the cutting head which also holds a set screw 7. When the set screw is turned, the oblique end face of the backing member 5 shifts the tool bit 4 in a radial direction. A shoulder 8 of the cutter head facing in a generally forward axial direction and elongated in a mainly radial direction projects into the recess 9 in abutting area contact with the edge face portion of the bit 4 opposite the axially projecting cutting edge.

The abutment member 2 and the recess 1 are dimensioned to permit limited radial movement of the abutment member while the bit 4 is shifted radially by the backing member 5, and the screw 3 can move similarly in the oversized opening of the wall portion which separates the recesses 1, 9. Because only shoulder portions of the abutment member 2 engage the wall portion, the screw 3 needs not to be loosened much from its clamping position to permit radial shifting of the bit 4. When the screw 3 thereafter is tightened to clamp the bit 4 to the wall portion of the cutter head, the set position of the bit is not affected. It is secured against displacement under working stresses by the screw 3, the shoulder 8 and the backing member 5.

It should be understood, of course, that the foregoing disclosure relates only to a preferred embodiment and that it is intended to cover all changes and modifications of the example of the invention herein chosen for the purpose of the disclosure which do not constitute departures from the spirit and scope of the invention set forth in the appended claims.

What is claimed is:

1. In a rotary cutting tool defining an axis of rotation and including a cutter head, at least one reversible tool bit having a cutting edge projecting from said cutter head, and fastening means releasably fastening said bit to said head, the improvement in the fastening means which comprises:
    (a) an abutment member,
        (1) said cutting head being formed with a first recess receiving said abutment member and a second recess receiving said bit, said cutting head having a surface facing in the direction of rotation of the cutting head and extending radially of the axis of rotation with said second recess formed in said surface and said first recess spaced from said second recess in the direction trailing said second recess in the direction of rotation of the cutting head,
   (2) a wall portion of said cutter head separating said first and second recesses;
(b) threaded fastening means extending through said bit and said wall portion and into said abutment for clamping said bit to said wall portion;
(c) said bit being plate-shaped and multi-sided and having two major faces and an edge face extending around the peripheral multi-sided edge of each said major face and connecting said major faces, said edge face having a portion corresponding to each side of said major faces and each said portion extending at an oblique angle to said major faces;
(d) said wall portion forming a base surface of said second recess and one of the major faces of said bit being in juxtaposition to said base surface and said cutter head forming at least two lateral side surfaces of said second recess, each lateral side surface being in abutting relation to one of said portions of said edge face, one of said portions of said edge face projecting from said second recess radially outwardly from said cutting head relative to the axis of rotation thereof and including said cutting edge; and
(e) backing means mounted in said cutting head and engaging one of said portions of said edge face disposed in abutting relation to one of said lateral side surfaces of said second recess for shifting said bit in the radial direction relative to the axis of rotation of said cutter head.

2. In a tool as set forth in claim 1, said fastening means including a threaded fastening member passing through an oversized opening in said wall portion, and said first recess and said abutment member being dimensioned to permit limited radial movement of said abutment member.

3. In a tool as set forth in claim 2, said major faces being rectangular and said edge face consisting of four said portions, another said portion being disposed at right angles from said one portion including said cutting edge, said the another said portion abuttingly engaging one of said lateral side surfaces in said second recess which extends radially relative to the axis of rotation of said cutter head.

4. In a tool as set forth in claim 2, said major faces of said bit being substantially square, said bit being formed with a bore therethrough through which said threaded member extends.

5. In a tool as set forth in claim 4, said edge face having four said portions, two of said portions being substantially perpendicular to said one portion including said cutting edge, said cutter head having one said lateral side surface in abutting engagement with one of said two portions, and said backing means buttingly engaging the fourth portion of said edge face.

6. In a tool as set forth in claim 5, the other one of said two portions projecting axially from said cutter head.

* * * * *

UNITED STATES PATENT OFFICE
CERTIFICATE OF CORRECTION

Patent No. 4,211,507　　　　　　　　Dated July 8, 1980

Inventor(s) Dieter Kress, et al

It is certified that error appears in the above-identified patent and that said Letters Patent are hereby corrected as shown below:

In the heading of the patent [73] should read as follows:

[73]　assignee : Mapal Fabrik für Präzisionswerkzeuge
　　　　　　　　　 Dr. Kress
　　　　　　　　　 Aalen, Fed. Rep. of Germany Signed and Sealed this Seventh Day of October 1980

[SEAL]

*Attest:*

SIDNEY A. DIAMOND

*Attesting Officer*　　　*Commissioner of Patents and Trademarks*